United States Patent Office 3,586,616
Patented June 22, 1971

3,586,616
BIS(PERFLUOROALKYLSULFONYL)METHANE METAL SALTS IN CATIONIC POLYMERIZATION
James E. Kropp, Maplewood, Minn., assignor to Minnesota Mining and Manufacturing Company, St. Paul, Minn.
No Drawing. Filed Mar. 14, 1969, Ser. No. 807,407
Int. Cl. B01j 1/10, 1/12; C08f 1/16
U.S. Cl. 204—159.11   12 Claims

ABSTRACT OF THE DISCLOSURE

Bis(perfluoroalkylsulfonyl)methane metal salts are used as latent catalysts in the curing or polymerization of cationic sensitive monomers, such as epoxides, vinyl ethers, N-vinyl compounds, aziridines, and acetals.

FIELD OF INVENTION

This invention relates to the curing of cationic sensitive monomers, such as epoxides which can be used, for example as adhesives, impregnants, potting resins, etc. In another aspect, it relates to a process for catalyzing the curing of such monomers with a new catalyst therefor, and to the cured products produced thereby. In another asepect, it relates to mixtures of such monomers and latent catalysts for the curing thereof. In a further aspect, it relates to the curing of such monomers with latent catalysts which are activated by heat or other means.

BACKGROUND OF THE PRIOR ART

The curing of cationic sensitive monomers with acid catalysts is well known in the art. For example, epoxides can be cured with boron trifluoride and complexes thereof; styrene can be polymerized with aluminum trichloride; and 1,4-diazabicyclo[2.2.2]octane can be polymerized with benzene sulfonic acid. While the curing of such monomers with such catalysts has been found to be advantageous in many cases, the use of some acid catalysts is often objectionable because such catalysts are highly corrosive to various substrates, such as metals. Other acid catalysts are objectionable because of their moisture sensitivity, their use requiring pre-drying of materials and special handling and storing techniques to exclude moisture, while other such catalysts are objectionable because of their volatility. Further, many of these acid catalysts rapidly catalyze the polymerization of the monomers with which they are admixed and cannot be used where a definite or prolonged shelf life and/or pot life is desired or required. Though some of these prior art acid catalysts can be used in a latent form, e.g. $BF_3 \cdot NH_2C_2H_5$, their latency is affected by moisture while prolonged latency is difficult to achieve; in addition, when these latent catalysts are activated, this gives rise to aforementioned objectionable corrosiveness or volatility.

This invention provides a novel class of latent catalysts for the curing of cationic sensitive monomers. These latent catalysts and the acids generated therefrom upon activation with heat or other means are only slightly corrosive and are non-volatile during use. These latent catalysts can be used in admixture with the monomers to provide latently curable compositions having desirable shelf or pot life. For example, the latency of curable epoxides at 122° F. can be increased to 25 to 50 days, and in some cases to as much as 125 days or more, by the practice of this invention.

DESCRIPTION OF THE INVENTION

The novel class of latent curing catalysts of this invention are metal salts of bis(perfluoroalkylsulfonyl) methanes, which preferably have the general formula:

$$[(R_fSO_2)_2C^{\ominus}R]_n M^{n\oplus} \quad (I)$$

where $R_f$ is fluoroalkyl (preferably perfluoroalkyl) having, for example 1 to 18 carbons and preferably 1 to 8 carbons, R is H, Br, Cl, alkyl having, for example 1 to 19 carbons and preferably 1 to 8 carbons, aryl such as phenyl, alkaryl such as benzyl, or R can be R'—Y where R' is an alkylene linking group having, for example 1 to 12 carbons and is preferably methylene or ethylene, Y is a substituent group such as —OH, —CH=$CH_2$, —COOH, Br, Cl,

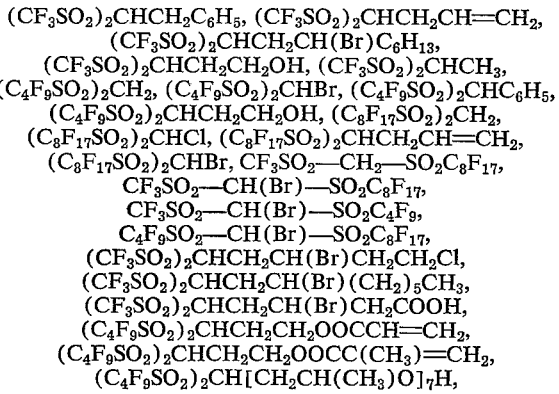

where R″ is H or —$CH_3$, which substituent group has little or no effect under the conditions of use of these compounds as curing catalysts, M is a mono- or polyvalent cation preferably having a valence of 1–3, of a metal selected from the group consisting of metals of Groups I to V and VIII, subgroups VI–B and VII–B, and those of the lanthanide and actinide series of the Periodic Table, and $n$ is an integer equal to the valence of said cation M.

Representative metal salts which can be used as latent catalysts to cure cationic sensitive monomers include the metal salts of $(CF_3SO_2)_2CH_2$ (the preferred acid in this invention), $(CF_3SO_2)_2CHCl$, $(CF_3SO_2)_2CHBr$, $(CF_3SO_2)_2CHCH_2C_6H_5$, $(CF_3SO_2)_2CHCH_2CH=CH_2$,
$(CF_3SO_2)_2CHCH_2CH(Br)C_6H_{13}$,
$(CF_3SO_2)_2CHCH_2CH_2OH$, $(CF_3SO_2)_2CHCH_3$,
$(C_4F_9SO_2)_2CH_2$, $(C_4F_9SO_2)_2CHBr$, $(C_4F_9SO_2)_2CHC_6H_5$,
$(C_4F_9SO_2)_2CHCH_2CH_2OH$, $(C_8F_{17}SO_2)_2CH_2$,
$(C_8F_{17}SO_2)_2CHCl$, $(C_8F_{17}SO_2)_2CHCH_2CH=CH_2$,
$(C_8F_{17}SO_2)_2CHBr$, $CF_3SO_2—CH_2—SO_2C_8F_{17}$,
$CF_3SO_2—CH(Br)—SO_2C_8F_{17}$,
$CF_3SO_2—CH(Br)—SO_2C_4F_9$,
$C_4F_9SO_2—CH(Br)—SO_2C_8F_{17}$,
$(CF_3SO_2)_2CHCH_2CH(Br)CH_2CH_2Cl$,
$(CF_3SO_2)_2CHCH_2CH(Br)(CH_2)_5CH_3$,
$(CF_3SO_2)_2CHCH_2CH(Br)CH_2COOH$,
$(C_4F_9SO_2)_2CHCH_2CH_2OOCCH=CH_2$,
$(C_4F_9SO_2)_2CHCH_2CH_2OOCC(CH_3)=CH_2$,
$(C_4F_9SO_2)_2CH[CH_2CH(CH_3)O]_7H$, and the like, including mixtures thereof. Representative of the metal cations of such metal salts are those of the metals lithium, sodium, potassium, magnesium, calcium, strontium, barium, yttrium, vanadium, manganese, cobalt, nickel, copper, silver, zinc, cadmium, mercury, lead, bismuth, lanthanium, neodymium, and gadolinium. The salts of the metals of Groups III, IV, V and VIII and Subgroups I–B, II–B, VI–B and VII–B are preferred because of their greater catalytic activity. (The Periodic Table referred to herein is that shown on pp. 448–449 of the Handbook of Chemistry & Physics, 34th ed. (1961–1962), published by Chem. Rubber Pub. Co., Cleveland, Ohio.)

(For purposes of brevity, the bis(perfluoroalkylsulfonyl) methane salts described herein are occasionally referred to as disulfonyl methane salts.)

The disulfonyl methane salts described above, as well as the free disulfonyl methane acid precursors thereof, are non-corrosive or practically non-corrosive towards metals, which is in sharp contrast to the commonly used cationic catalysts, such as protonic and Lewis acids, which are highly corrosive to metals. Further disulfonyl methane salt catalysts of this invention generally are solids and they as well as their acid precursors have high solubility in common solvents, such as chloroform, acetone, methanol, ether, water and other solvents, and are also soluble in many of the polymerizable cationic sensitive monomers. For example $(CF_3SO_2)_2CHAg$ will form a 50% weight in volume solution of acetonitrile and is readily soluble in propylene oxide, epoxides such as cycloaliphatic epoxides, and is soluble in aliphatic or aromatic glycidyl ethers, as well as vinyl ethers such as hydroxybutyl vinyl ether, N-vinyl compounds, such as N-vinyl pyrrolidone, etc. In contrast to such acid catalysts as HCl and $BF_3$, the disulfonyl methane salts and acid percursors are relatively non-volatile and thus are capable of maintaining an essentially constant catalyst concentration in those curing applications that require heating. Though the disulfonyl methane salts may be hygroscopic in some instances, this property will not generally present any problems during curing and the acid precursors themselves are essentially moisture insensitive, thus allowing the polymerization of monomers without a prior drying procedure and without elaborate precautions to exclude moisture.

The disulfonyl methane salts used in this invention can be prepared by simply neutralizing the disulfonyl methane acid precursors with a metal oxide, hydroxide, or carbonate or metal salt, e.g. $AgNO_3$. For example, $(CF_3SO_2)_2CH_2$ dissolved in a solvent, e.g. benzene, can be stirred with a suspension of a silver oxide, the water of reaction azeotroped off, the mixture filtered, and the organic phase evaporated to dryness to yield the corresponding salt $(CF_3SO_2)_2CHAg$.

The simplest disulfonyl methane acid precursor of the latent salts used in this invention $(CF_3SO_2)_2CH_2$, is described by Gramstad and Hazeldine in J. Chem. Soc. 4069 (1957) and by Brice and Trott in U.S. Pat. No. 2,732,398. Higher perfluoroalkyl homologs are described by Heine in U.S. Pat. No. 3,281,472. The two $R_f$'s in the disulfonyl methane can be the same or different. For example, the catalyst can be $C_8F_{17}SO_2$—$CH_2$—$SO_2CF_3$, which can be prepared by reacting $C_8F_{17}SO_2F$ with $ClMgCH_2SO_2CF_3$ Grignard reagent. Various substituted bis(perfluoroalkylsulfonyl)methanes, where R is R'—Y in above Formula I, and metal salts thereof, and their preparation, are described in copending application Ser. No. 807,408 filed concurrently herewith by Koshar. Koshar's disclosed process can also be used to prepare disulfonyl methanes such as $(R_fSO_2)_2CHAr$ and $(R_fSO_2)_2CH$—$CH_2Ar$ (where Ar is an aryl, such as phenyl) by reacting the corresponding perfluoroalkylsulfonyl fluoride with benzyl magnesium halide or by reacting the Grignard of the bis(perfluoroalkylsulfonyl)methane with benzyl halide.

The term "latent catalyst" as used herein means a catalyst which does not exhibit or manifest any substantial curing or catalytic effect on monomer admixed therewith during normal storage or handling of such mixtures until the mixture is subjected to some activation for the purpose of "de-latentizing" or generating the free disulfonyl methane, though some small or otherwise tolerable or insignificant curing of the monomer may take place before activation, as evidenced by a slight increase in viscosity. Similarly, a composition which has latency or is characterized as being latently curable is one which during the period prior to being activated, e.g. heated, to effect cure, exhibits little if any gelling, etc., though some small or otherwise tolerable or insignificant curing may take place during such period. In one aspect of this invention, latently curable compositions are initially or preliminarily exposed for a short time to actinic light, e.g. UV, so that the composition will subsequently become cured. When accelerated by heat, such curing will take place more rapidly than if such initial exposure or irradiation were not used. Such initial exposure in effect "photo-triggers" the curing of the composition and begins the development of cure which may proceed slowly at room temperature or rapidly at elevated temperature. These photo-triggered systems have useful pot-life (e.g. from a few hours to months, depending on the particular system) though the duration thereof will not be as long as the latency of non-exposed compositions.

The preferred latent salts used in this invention can be represented by the general formula:

$$[(R_fSO_2)_2C^{\ominus}R]_nM^{n\oplus} \qquad (II)$$

where $R_f$ is perfluoroalkyl having 1 to 8 carbon atoms, and is preferably perfluoromethyl, as defined above in general Formula I, R is H, Br, or lower alkyl (i.e., one with 1 to 8 carbon atoms), preferably methyl, and M is a metal cation having a valence equal to $n$, and selected from the group consisting of the cations of silver, nickel, and zinc.

Storage stable mixtures of the monomer and latent catalyst can be made up as one-component latently curable mixtures and later applied or shaped, and the applied or shaped mixture activated to release the disulfonyl methane in its acid form and cause polymerization of the monomers. Such activation can be accomplished by heating the latent catalyst (admixed, of course, with the cationic sensitive monomer) to generate or liberate the disulfonyl methane acid, or by exposing the mixture to actinic light, such as ultraviolet light ("UV"), particularly in conjunction with elevated temperatures. Some of the latent catalysts, i.e. the silver, copper, mercury, and thallium salts, are susceptible to UV phototriggerability, particularly when used in conjunction with an aromatic halide sensitizer or promoter, e.g. halobenzenes, such as disclosed by Cripps in U.S. Pat. No. 3,347,676. Mixtures of monomer with such catalyst and sensitizers can be exposed to UV for a sufficient period of time, e.g. 1 minute to 30 minutes, or longer, at ambient or room temperature and this triggered mixture can be later applied or shaped and then allowed to stand at room temperature, or heated or further irradiated to effect the curing of the applied or shaped mixture.

Where actinic light is used to effect cure of the latently curable mixtures or to produce triggered mixtures, actinic light of wavelengths from about 2500 A. to about 7000 A. can be used from such sources as sunlight, mercury arc, fluorescent light bulbs, etc. The preferred actinic light to be used in effecting the cure (as well as to impart photo-modified latency to monomer-catalyst composition) is ultraviolet light, the latter being photon energy or light of wavelengths less than 4000 A., the lower limit of wavelength being determined by the transmission characteristics of the materials through which the light must pass. The lower limit is usually in the range of 1800 to 2000 A., although light of any wavelength between 1800 and 4000 A. can be used, wavelengths of 2000 to 4000 A. being preferred. Irradiation sources high in ultraviolet output are preferred sources, and mercury vapor arc lamps, such as a Ferro Allied 1440 watt UV lamp, will be most useful because of the relatively intense source of the preferred UV light. The length of time that the polymerizable or curable composition is exposed to actinic light, whether for the purpose of phototriggering or curing the composition, will vary and depend on the particular composition to be irradiated, as well as the light source used and the temperature; generally, exposure times will vary between 1 minute and 1 hour, and the particular duration to be used can be determined empirically by simple routine exposure of samples.

The polymerization or curing of cationic sensitive monomers in the presence of the disulfonyl methane metal salt catalysts can be carried out by simply mixing the monomeric material with the metal salt and allowing the curing to take place at an elevated temperature and/or in the presence of actinic light, with or without phototriggering the composition as described above.

As mentioned above, the disulfonyl methane metal salts are soluble in common solvents as well as in a wide variety of polymerizable monomers, which property makes it convenient to mix the latent catalyst with the monomers to obtain a homogeneous mixture. Solvents which can be used for the polymerization representatively include solvents such as acetone, butyrolactone, acetonitrile, methanol, Cellosolve, dimethylformamide, and the like. In some cases, it will be desirable to mix the monomer with a solution of the disulfonyl methane salt catalyst in a solvent, such as acetonitrile, butyrolactone, etc.

In general, the polymerization can be carried out at room temperature (or as low as 0° C. in some cases) where actinic light (e.g. UV) is used to de-latentize the salt catalyst, though elevated temperatures, e.g. 23 to 200° C., preferably 50 to 100° C., can be used in conjunction with the actinic light to accelerate the cure.

The particular amount of catalyst to be used and temperature of polymerization will vary, of course, and be dependent on the particular monomers used and the particular catalyst used, as well as the particular application to be made. Generally, the amount of disulfonyl methane metal salt to be used will be in the range of 0.1 to 20 weight percent, preferably 0.1 to 5 weight percent, based on the weight of cationic monomeric material.

The monomers that can be cured or polymerized with the disulfonyl methane metal salt catalysts of this invention, using the latter in its active or latent forms, are those known to undergo cationic polymerization and contain a hetero oxygen or nitrogen atom attached to one of the carbon atoms of a carbon-carbon double bond (i.e. ethylenic unsaturation), e.g. monomers that contain the structure.

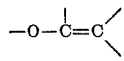

or monomers which polymerize by ring opening of cyclic groups containing hetero O or N ring atoms. By way of contrast, ethylenically unsaturated hydrocarbons, such as as isobutylene, vinylbenzene, divinylbenzene, dipropenylbenzene, and tripropenylbenzene cannot be cured with the disulfonyl methane catalysts of this invention.

One useful class of the cationic sensitive monomers can be represented by the general formula:

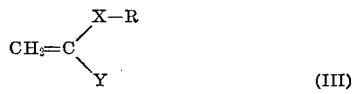

where X is —O— or —NR'— (where R' is hydrogen or lower alkyl), R is hydrocarbyl, halohydrocarbyl, or hydroxyhydrocarbyl when X is oxygen, or R is hydrocarbyl or hydrocarbylsulfonyl when X is nitrogen, and Y is hydrogen, alkyl, aryl, or other hydrocarbyl, or R (as hydrocarbyl) and R can be connected to form a 5- or 6-membered cyclic structure containing nitrogen as a hetero ring atom. The term "hydrocarbyl" is used herein in its usual sense to mean alkyl, alkenyl, aryl, cycloalkyl, cycloalkenyl, alkaryl, arylalkyl, and the like. In general, monomers of this type contain a vinyl group and are typified by vinyl alkyl ethers, such as vinyl methyl ether, vinyl ethyl ether, vinyl n-butyl ether, vinyl 2-chloroethyl ether, vinyl isobutyl ether, vinyl phenyl ether and vinyl 2-ethylhexyl ether, vinyl ethers of substituted aliphatic alcohols, such as ω-hydroxybutyl vinyl ether, and N-vinyl compounds such as N-vinyl-N-methyl octanesulfonamide. A description of vinyl monomers and their use in preparing polymers is set forth in "Vinyl and Related Polymers," by Schildknecht, published by John Wiley & Sons, Inc., New York (1952).

Cationic sensitive monomers which polymerize by ring opening of O-heterocyclic groups and which can be used in the practice of this invention are those which typically contain one or more epoxy groups, which has the structure

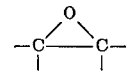

Such monomers, broadly called epoxides, include epoxy compounds and epoxides of the polymeric type and can be aliphatic, cycloaliphatic, aromatic or heterocyclic and will typically have an epoxy equivalency (i.e. the number of epoxy groups contained in the average molecule) of from 1.0 to 6.0, preferably 1 to 3, this value being the average molecular weight of the epoxide divided by the epoxide equivalent weight. Such epoxide monomers are well known and include such epoxides as epichlorohydrins, e.g. epichlorohydrin, alkylene oxides, e.g. propylene oxide, styrene oxide, alkenyl oxides, e.g. butadiene oxide, glycidyl esters, e.g. ethyl glycidate, glycidyl-type epoxy resins, e.g. the diglycidyl ethers of Bisphenol A and of novalak resins, such as described in "Handbook of Epoxy Resins," by Lee and Neville, McGraw-Hill Book Co., New York (1967).

Particularly useful epoxides which can be used in this invention are those which contain one or more cyclohexene oxide groups such as the epoxycyclohexanecarboxylates, typified by 3,4 - epoxycyclohexylmethyl - 3,4-epoxycyclohexanecarboxylate, 3,4 - epoxy - 2 - methylcyclohexylmethyl - 3,4 - epoxy - 2 - methylcyclohexane carboxylate, and bis(3,4 - epoxy - 6 - methylcyclohexylmethyl)adipate. For a more detailed list of useful epoxides of this nature, reference is made to the U.S. Pat. No. 3,117,099.

Further epoxides which are particularly useful in the practice of this invention include glycidyl ether monomers of the formula

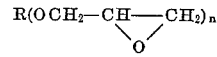

where R is alkyl or aryl and $n$ is an integer of 1 to 6. An example is the glycidyl ethers of polyhydric phenols obtained by reacting a polyhydric phenol with an excess of chlorohydrin, such epichlorohydrin, e.g. the diglycidyl ether of 2,2-bis(2,3-epoxy propoxyphenol)propane. Further examples of epoxides of this type which can be used in the practice of this invention are described in U.S. Pat. No. 3,018,262.

Other cationic sensitive monomers which can be polymerized in the practice of this invention include those which polymerize by ring opening of N-heterocyclic groups, which have the structure

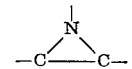

Such monomers, include those having the structures

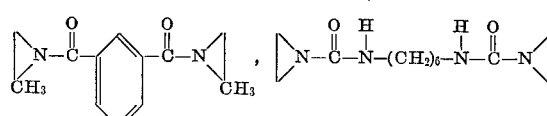

and 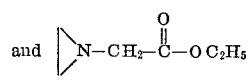

Another useful class of monomers which can be used are the acetals, such as trioxane.

There are a host of commercially available cationic sensitive monomers which can be used in this invention. In particular, epoxides which are readily available include propylene oxide, epichlorohydrin, styrene oxide, vinyl cyclohexene oxide, glycidol, glycidyl methacrylate, diglycidyl ether of Bisphenol A (e.g., Epon 828 and DER 332), vinylcyclohexene dioxide (e.g., ERL–4206), 3,4-epoxycyclohexylmethyl - 3,4 - epoxycyclohexane carboxylate (e.g., ERL–4221), 3,4 - epoxy - 6 - methylcyclohexylmethyl - 3,4 - epoxy - 6 - methylcyclohexane carboxylate (e.g. ERL–4201), bis( 3,4-epoxy - 6 - methylcyclohexylmethyl)adipate (e.g., ERL–4289), bis(2,3-epoxycyclopentyl)ether (e.g. ERL–0400), aliphatic epoxy modified with polypropylene glycol (e.g., ERL–4050 and ERL–4052), dipentene dioxide (e.g. ERL–4269), epoxidized polybutadiene (e.g. Oxiron 2001), silicone epoxy (e.g., Syl-Kem 90), 1,4 - butanediol diglycidyl ether (e.g., Araldite RD-2), polyglycidyl ether of phenolformaldehyde novolak (e.g., DEN–431 and DEN–438) and resorcinol diglycidyl ether (e.g., Kopoxite).

The curable compositions of this invention, comprising the cationic monomer and disulfonyl methane salt, can be used for applications like those cationic monomer systems cured with other catalysts, such as epoxides cured with $BF_3 \cdot NHC_2H_5$. For example, the compositions of this invention can be used as adhesives, caulking and sealing compounds, casting and molding compounds, potting and encapsulating compounds, impregnating and coating compounds, etc., depending on the particular monomers and/or catalyst used. The latently curable composition can be used as a one-component or cured-in-place system, such capability enhancing its use for the applications mentioned above. One particular application where such capability can be capitalized on is in the electrical area, where such latently curable compositions can be used to coat or impregnate for insulation or protective purposes electrical motor windings or coils, transformers, capacitors, electrical terminals, cables, and other electrical devices.

EXAMPLES

The object and advantages of this invention are further illustrated by the following examples, but the particular materials and amounts thereof recited in these examples as well as other conditions and details should not be construed to unduly limit this invention.

EXAMPLE 1

Samples of a vinyl ether of a novolak (ET 395–480) were mixed with either 1 wt. percent or 5 wt. percent of $(CF_3SO_2)_2CHAg$, based on the weight of the divinyl ether. The sample containing 5 wt. percent latent catalyst cured to a solid at room temperature within ½ hr. and the sample containing 1 wt. percent latent catalyst cured to a solid in 2 hrs. These results indicate that for this particular system that latency can be prolonged by using a lower amount of the latent catalyst.

EXAMPLE 2

A sample containing 6.6 g. of hydroxybutylvinyl ether capped-toluene diisocyanate and 3.3 g. of acetonitrile was treated with 5 wt. percent of $(CF_3SO_2)_2CHAg$. This sample cured after 2 weeks storage at 122° F. A similar sample containing 5 g. of said capped diisocyanate with 5 g. of acetonitrile was treated with 5 wt. percent of said catalyst and stored for 8 weeks at 122° F. before it cured.

Portions of the above samples and additional samples similar to the above samples with the difference of containing 1 wt. percent of said catalyst, were exposed to UV light and they cured almost completely after 15 min.

EXAMPLE 3

A number of 2 ml. samples of diethyleneglycol divinyl ether were mixed with varying amounts of a solution of 0.1 g. of $(CF_3SO_2)_2CBrAg$ in 1 ml. of acetonitrile. To some of these samples, 0.2 ml. of 1,2,4-trichlorobenzene sensitizer was also added. All of the samples were irradiated with UV for various periods of time at room temperature; at the end of which the nature of the cure, if any, was noted, and the samples thereafter were allowed to stand at room temperature for 3 hrs., at which time the nature of the cure, if any, was again observed. Results are shown in Table I.

TABLE I

| Amt. of latent catalyst soln. used, ml. | Nature of sample initially irradiated for indicated period | | | | | |
|---|---|---|---|---|---|---|
| | Without sensitizer | | | With sensitizer | | |
| | 1 min. | 4 min. | 5 min. | 1 min. | 5 min. | 8 min. |
| | Initial nature of irradiated sample: | | | | | |
| 0.05 | NC [1] | NC | NC | NC | NC | NC |
| 0.10 | NC | NC | NC | NC | Hard solid. | |
| 0.20 | NC | NC | NC | NC | do | |
| | Nature of irradiated sample after 3 hrs. at room temp.: | | | | | |
| 0.05 | | NC | NC | NC | | Soft solid. |
| 0.10 | | NC | Vis. liq. | Soft solid | | |
| 0.20 | | Vis. liq. | Soft solid | Hard solid | | |

[1] NC means no change in sample, i.e. it was still fluid.

These data show in general that the latent catalysts have triggerability in irradiated systems (though if the system contains a sensitizer, too much irradiation will cure the system). Lower levels of latent catalyst and/or shorter periods of irradiation will give a longer time to reach the triggered cure, while higher levels of catalyst and/or longer periods or irradiation will give a shorter time to reach the triggered cure.

EXAMPLE 4

A number of 1 g. mixtures of diglycidyl ether of the diglycidyl ether of Bisphenol A (Epon 828) diluted with 2–5 wt. percent of phenyl glycidyl ether were mixed with 1 or 2 drops of a 10 wt. percent acetonitrile solution of a disulfonyl methane salt catalyst. Some of the samples were irradiated with an infrared lamp for a period of 15 min. All samples were allowed to stand at room temperature and the nature of the cure, if any, at room temperature and the nature of the cure, if any, was noted thereafter. Results are set forth in Table II.

TABLE II

| Catalyst | IR period | Nature of sample at indicated time | | | | |
|---|---|---|---|---|---|---|
| | | 1 hr. | 1 day | 5 days | 7 days | 1 mo. |
| 1 drop of 10% $(CF_3SO_2)_2CHAg$ | None | NC [1] | NC | NC | NC | NC |
| 1 drop of 10% $(CF_3SO_2)_2CBrAg$ | do | NC | NC | Skin [2] | Skin | Skin. |
| 1 drop of 10% $(CF_3SO_2)_2CBrAg$ | 15 min | Sl. vis. liq. | High vis. liq. | Bodied liq. | Soft solid. | Hard solid. |
| 2 drops of 10% $(CF_3SO_2)_2CBrAg$ | 15 min | Sl. vis. liq. | Bodied liq. | Soft solid. | Hard solid. | Do. |

[1] "NC" means no change in sample, i.e. it was still fluid.
[2] "Skin" means a thin film formed on top of the sample.

9

These data show generally good latency is obtained for the non-irradiated systems.

EXAMPLE 5

A 1 g. sample of a cycloaliphatic epoxide (ERL–4050) was mixed with 1 to 3 drops of a 10 wt. percent solution of $(CF_3SO_2)_2CHAg$ in acetonitrile and the mixture irradiated for 5 min. with a UV lamp. Such irradiation did not cure the sample but after warming in a 250° F. oven, the sample cured to a solid within 1 hr.

EXAMPLE 6

A sample of Epon 828 epoxy containing 5 wt. percent $(CF_3SO_2)_2CHAg$ was exposed to UV light for 15 min. The resulting sample darkened but did not cure. Upon standing at RT for 1 month, a cured solid was obtained.

EXAMPLE 7

One gram samples of Epon 828 epoxy were treated with 0.1 to 5 wt. percent of disulfonyl methane salts

$(CF_3CO_2)_2CHAg$ and $(CF_3SO_2)_2CBrAg$ and heated at temperatures of 122, 200, 250, 300, 350 and 400° F. All samples cured to hard solids. One gram samples of ERL–4050 epoxy were similarly treated and heated to give hard solids.

EXAMPLE 8

Samples of a mixture of 70 parts by weight polyglycidyl ether of phenolformaldehyde novolak (DEN–438) and 30 parts by weight of Epon 828 epoxy were mixed with 5 wt. percent of a disulfonyl methane salt. The samples were heated at various temperatures and the time noted at which a gelled product resulted. Results are summarized in Table III.

TABLE III

| Gelling temp., °F. | Gel time using $(CF_3SO_2)_2CHAg$, min. | Gel time using $(CF_3SO_2)_2CBrAg$, min. |
| --- | --- | --- |
| 122 | -------- | >86,400 |
| 200 | 1,325 | 1,490 |
| 250 | 70 | 15 |
| 300 | 10 | 2.5 |
| 400 | 0.66 | 0.28 |

These data show the excellent latency of the system at low temperatures and the rapid cure obtained at elevated temperatures.

EXAMPLE 9

A number of 1 g. samples of Epon 828 epoxy or ERL–4050 epoxy were mixed with 1 wt. percent of a disulfonyl methane salt and heated at 300° F. or 400° F., and the time noted for the point at which a solid cured product resulted. Results are summarized in Table IV.

TABLE IV

| Latent catalyst used | Cure temp., °F. | Time at which cure was noted using Epon 828 | Time at which cure was noted using ERL-4050 |
| --- | --- | --- | --- |
| None | 400 | 21–46 hrs | 2.5–4 hrs. |
| $(CF_3SO_2)_2CHAg$ | 300 | 5 min | 1 min. |
| $(CF_3SO_2)_2CBrAg$ | 300 | 3 min | 1 min. |
| $(CF_3SO_2)_2CCH_3Ag$ | 300 | -------- | 15 min. |
| $(CF_3SO_2)_2CHK$ | 400 | 4 hrs | 4 hrs. |
| $[(CF_3SO_2)_2CH]_2Ni$ | 400 | 7 min | |
| $[(CF_3SO_2)_2CH]_2Pb$ | 300 | 4 min | |
| $[(CF_3SO_2)_2CH]_2Zn$ | 300 | 10 min | |
| $[(CF_3SO_2)_2CH]_2Mn$ | 300 | 2 min | |
| $[(CF_3SO_2)_2CH]_2Sn$ | 300 | 5 min | |
| $[(CF_3SO_2)_2CH]_3Sm$ | 300 | 2 min | |

The above data in general show that the catalysts rapidly catalyze the cure at elevated temperatures, though the potassium salt catalyst was not effective for the ERL–4050 epoxy under the conditions used.

EXAMPLE 10

A number of samples of Epon 828 epoxy and ERL–4050 epoxy were mixed with 1 or 5 wt. percent of a disulfonyl methane salt. The samples were stored at 122° F. and the time at which the stored product gelled was noted. For purposes of comparison, similar epoxy samples containing 5 wt. percent of three different bis(perfluoromethylsulfonyl)methanes (the free acids) and similar epoxy samples containing 1 or 5 wt. percent of a conventional latent acid catalyst were prepared, stored either at room temperature or 122° F. and observed. Results are set forth in Table V.

TABLE V

| Catalysts | Conc. of cat., wt. percent | Time of Epon 828 to gel | Time for ERL–4050 to gel |
| --- | --- | --- | --- |
| $(CF_3SO_2)_2CH_2$ | 5 | 20 min. (R.T.)[1] | 1 min. (R.T.).[1] |
| $(CF_3SO_2)_2CHBr$ | 5 | 1 min (R.T.)[1] | 0.5 min. (R.T.).[1] |
| $(CF_3SO_2)_2CHCH_3$ | 5 | -------- | 3 min. (R.T.).[1] |
| $BF_3 \cdot NH_2C_2H_5$ | 5 | -------- | 4 days. |
| $BF_3 \cdot NH_2C_2H_5$ | 1 | -------- | 10 days. |
| $(CF_3SO_2)_2CHAg$ | 5 | 140 days | 120 days. |
| $(CF_3SO_2)_2CHAg$ | 1 | do | 140 days. |
| $(CF_3SO_2)_2CBrAg$ | 5 | 120 days | 75 days. |
| $(CF_3SO_2)_2CBrAg$ | 1 | do | 120 days. |

[1] "R.T." means sample stored at room temperature rather than 122° F.

EXAMPLE 11

The rates of corrosion of iron and aluminum by $(CF_3SO_2)_2CH_2$, HCl, and $BF_3 \cdot O(C_2H_5)_2$ were determined by potentiostatic polarization curves in a static 0.5% NaCl solution with $10^{-3}M$ additions of the various catalysts at 23° C. Oxygen was not excluded. The metal specimens were pure iron (99.9% Fe) and 6061 aluminum alloy (97% Al). Results are shown below in Table VI.

TABLE VI

| Catalyst | Corrosion rate (mils/yr.) | |
| --- | --- | --- |
| | Iron | Aluminum alloy |
| None | 16 | 0.5 |
| HCl | [1]77 | 2.1 |
| $BF_3 \cdot O(C_2H_5)_2$ | 98 | 33 |
| $(CF_3SO_2)_2CH_2$ | 44 | 1.8 |

[1] Average of three runs; all other results in Table VI are averages for 2 runs.

The above data show that under similar conditions the disulfonyl methane acid (which is generated by activation of the latent salts of the invention) resulted in significantly less corrosion on typical metal substrates than that which resulted when HCl and the boron trifluoride complex catalysts were used.

EXAMPLE 12

ERL–4221 epoxy mixed with 0.1 wt. percent of $(CF_3SO_2)_2CHAg$ was cured in a mold for 2 hrs. at 300° F. The sample was then removed from the mold and post cured for 19 hrs. at 300° F. The electrical properties of the cured sample were then tested according to ASTM D–150–65T. Results are summarized in Table VII. A portion of this sample was stored at 122° F. and was not cured after 65 days.

TABLE VII
Electrical properties at 100 Hz.

| Temp., °C. | Dielectric const. | Dissipation factor |
| --- | --- | --- |
| 23 | 3.32 | 1.0 |
| 60 | 3.52 | 1.1 |
| 90 | 4.27 | 1.3 |
| 105 | 4.42 | 1.9 |
| 120 | 4.47 | 2.1 |
| 130 | 4.49 | 2.7 |
| 155 | 4.66 | 3.5 |
| 180 | 4.98 | 5.2 |
| 200 | 4.16 | 6.3 |

The data above show that the cured resin had very good, electrical insulation properties, in addition to being latent particularly when compared with commercially available ERL–4221 epoxy/Empol 1022 resin curable with stannous octoate, such a cured system reportedly having a dissipation factor of 2.0% at 150° F. and 5.6% at 175° F., but latency of less than one day at 122° F.

EXAMPLE 13

A number of different cationic sensitive monomers were mixed with 5 wt. percent of $(CF_3SO_2)_2CHAg$ catalyst and heated to effect cure in accordance with this invention. For purposes of comparison, the same monomers were heated in the absence of catalyst. Results are summarized in Table VIII.

TABLE VIII

| Monomer | Cure temp., °F. | Nature or cured product With catalyst | Without catalyst |
|---|---|---|---|
| N-vinyl-N-methyloctane sulfonamide | 300 | Solid | Liquid. |
| N-vinyl pyrrolidone | 300 | ---do--- | Do. |
| Trioxane | 170 | ---do--- | Vaporized. |
| N-(carbethoxy methyl)aziridine | 170 | ---do--- | Liquid. |

Various modifications and alterations of this invention will become apparent to those skilled in the art without departing from the scope and spirit of this invention, and it should be understood that this invention is not to be unduly limited to the illustrative embodiment set forth herein.

I claim:

1. The process comprising contacting cationic sensitive monomer with a metal salt of bis(fluoroalkylsulfonyl) methane to effect polymerization thereof, said monomer being ethylenically unsaturated and having an oxygen or nitrogen atom attached to one of the carbon atoms of a carbon-to-carbon double bond or polymerizing by ring opening of cyclic groups containing a hetero oxygen or nitrogen ring atom, and being selected from the group consisting of epoxides, vinyl ethers, N-vinyl compounds, aziridines, and acetals.

2. The process according to claim 1, wherein said bis(fluoroalkylsulfonyl) methane has the formula $$(R_fSO_2)_2CHR$$

where $R_f$ is perfluoroalkyl, R is H, Br, Cl, alkyl, aryl, alkaryl or —R'—Y, where R' is alkylene and Y is —OH, —CH=CH$_2$, —COOH, Br, Cl, or $$—O—CO—CR''CH_2$$

where R'' is H or —CH$_3$, and said metal is selected from Groups I to V and VIII, Subgroups VI–B and VII–B, and lanthanide and actinide series of metals of the Periodic Table.

3. The process according to claim 1, wherein said bis(perfluoroalkylsulfonyl) methane metal salt is $$[(CF_3SO_2)_2CH]_2Ni$$

$(CF_3SO_2)_2CHAg$ or $(CF_3SO_2)_2CBrAg$.

4. The process according to claim 1, wherein said mixture of monomer and metal salt further comprises an aromatic halide sensitizer and the resultant mixture is initially irradiated with ultra-violet light prior to effecting polymerization of said resultant mixture at elevated temperature or room temperature, and said metal salt is a photo-sensitive salt.

5. The process comprising admixing cationic sensitive epoxide with bis(perfluoroalkylsulfonyl) methane silver salt and heating the resultant mixture to effect cure of said epoxide.

6. The process according to claim 5, wherein said salt is $(CF_3SO_2)_2CHAg$, $(CF_3SO_2)_2CBrAg$, or $$(CF_3SO_2)_2CHNi$$

7. The process according to claim 5, further comprising admixing said mixture of epoxide and salt with trichlorobenzene and irradiating the resultant mixture with ultraviolet light prior to effecting said cure at elevated temperature or room temperature.

8. The process according to claim 5, further comprising applying or shaping said mixture prior to said heating to effect said cure.

9. A composition comprising a mixture of a metal salt of a bis(perfluoroalkylsulfonyl) methane and a cationic sensitive monomer said monomer being ethylenically unsaturated and having an oxygen or nitrogen atom attached to one of the carbon atoms of a carbon-to-carbon double bond or polymerizing by ring opening of cyclic groups containing a hetero oxygen or nitrogen ring atom, and being selected from the group consisting of epoxides, vinyl ethers, N-vinyl compounds, aziridines and acetals.

10. The composition of claim 9 irradiated with actinic light, wherein said metal salt is photo-sensitive.

11. The process according to claim 1, wherein said cationic sensitive monomer is 3,4-epoxycyclohexylmethyl-3,4-epoxycyclohexane carboxylate.

12. The composition according to claim 9, wherein said metal salt is $(CF_3SO_2)_2CHAg$, and wherein said cationic sensitive monomer is 3,4 - epoxycyclohexylmethyl - 3,4-epoxycyclohexane carboxylate.

References Cited

UNITED STATES PATENTS 2,732,398   1/1956   Brite et al. _____ 260—503
3,281,472  10/1966   Heine _____ 260—607

MURRAY TILLMAN, Primary Examiner

R. B. TURER, Assistant Examiner

U.S. Cl. X.R.

204—159.13, 159.14, 159.21, 159.24; 260—2, 47, 59, 67, 78, 79.7, 88.3, 91.1, 94.7, 430, 439; 252—431